US012672122B2

(12) United States Patent
Koskinen et al.

(10) Patent No.: US 12,672,122 B2
(45) Date of Patent: Jun. 30, 2026

(54) PROTOCOL DATA UNIT WITH SERVICE DATA UNIT SEGMENT AND INDICATION OF SERVICE DATA UNIT-TAIL LENGTH

(71) Applicant: Nokia Technologies Oy, Espoo (FI)

(72) Inventors: Henri Markus Koskinen, Espoo (FI); Benoist Pierre Sebire, Tokyo (JP)

(73) Assignee: Nokia Technologies Oy, Espoo (FI)

( * ) Notice: Subject to any disclaimer, the term of this patent is extended or adjusted under 35 U.S.C. 154(b) by 314 days.

(21) Appl. No.: 18/366,854

(22) Filed: Aug. 8, 2023

(65) Prior Publication Data

US 2024/0057063 A1    Feb. 15, 2024

Related U.S. Application Data

(60) Provisional application No. 63/396,446, filed on Aug. 9, 2022.

(51) Int. Cl.
*H04W 72/12*        (2023.01)
*H04W 72/563*       (2023.01)

(52) U.S. Cl.
CPC ......... *H04W 72/12* (2013.01); *H04W 72/563* (2023.01)

(58) Field of Classification Search
CPC . H04W 28/0205; H04W 72/12; H04W 72/23; H04W 72/563
See application file for complete search history.

(56) References Cited

U.S. PATENT DOCUMENTS

| | | | |
|---|---|---|---|
| 8,817,806 B2 | 8/2014 | Kim et al. | |
| 10,701,588 B2 | 6/2020 | Turtinen et al. | |
| 11,051,322 B2 * | 6/2021 | Yu | H04W 28/14 |
| 12,052,662 B2 * | 7/2024 | Kung | H04W 72/0446 |
| 2008/0192748 A1 | 8/2008 | Kim et al. | |
| 2009/0003283 A1 * | 1/2009 | Meylan | H04L 1/008 |
| | | | 370/331 |
| 2009/0116436 A1 * | 5/2009 | Okuda | H04W 28/20 |
| | | | 370/329 |
| 2009/0175206 A1 | 7/2009 | Wang et al. | |
| 2012/0099468 A1 * | 4/2012 | Wang | H04W 28/06 |
| | | | 370/252 |

(Continued)

FOREIGN PATENT DOCUMENTS

| | | | | |
|---|---|---|---|---|
| EP | 2136598 B1 * | 4/2016 | ........... | H04W 72/21 |
| KR | 20190017604 A | 2/2019 | | |

OTHER PUBLICATIONS

"3rd Generation Partnership Project; Technical Specification Group Radio Access Network; NR; Radio Link Control (RLC) protocol specification (Release 16)", 3GPP TS 38.322, V16.0.0, Mar. 2020, pp. 1-33.
U.S. Appl. No. 62/406,090, "Enabling Configurable Segmentation", filed on Oct. 10, 2016, pp. 1-51.
Kumar et al., "Dynamic Control of RLC Buffer Size for Latency Minimization in Mobile RAN", IEEE Wireless Communications and Networking Conference (WCNC), Apr. 15-18, 2018, 6 pages.

(Continued)

*Primary Examiner* — Utchung Chu
(74) *Attorney, Agent, or Firm* — Robert P. Michal, Esq.; Rimon PC

(57)        ABSTRACT

Systems, methods, apparatuses, and computer program products for protocol data unit (PDU) with service data unit (SDU) segment and indication of SDU-tail length. A method may include transmitting, to a network element, a radio link control data protocol data unit including a non-last segment of a service data unit. The protocol data unit may include an indication of a number of bytes of the service data unit that follow this segment in the service data unit.

15 Claims, 5 Drawing Sheets

Transmit, to a network element, a radio link control data protocol data unit comprising a non-last segment of a service data unit

300

(56) References Cited

U.S. PATENT DOCUMENTS

| | | | |
|---|---|---|---|
| 2015/0256472 A1* | 9/2015 | Lee | H04L 47/196 |
| | | | 370/471 |
| 2018/0176937 A1* | 6/2018 | Chen | H04W 72/21 |
| 2018/0317114 A1* | 11/2018 | Kim | H04W 24/10 |
| 2019/0053099 A1* | 2/2019 | Kim | H04W 28/0278 |
| 2019/0149365 A1* | 5/2019 | Chatterjee | H04W 76/11 |
| | | | 370/329 |
| 2019/0327623 A1* | 10/2019 | Liu | H04W 8/24 |
| 2019/0334834 A1* | 10/2019 | Yu | H04W 28/0252 |
| 2019/0356429 A1 | 11/2019 | Kim et al. | |
| 2020/0205224 A1 | 6/2020 | Lee et al. | |
| 2020/0287615 A1 | 9/2020 | Zhu et al. | |
| 2020/0351910 A1* | 11/2020 | Joseph | H04W 72/21 |
| 2021/0367899 A1 | 11/2021 | Kim et al. | |
| 2022/0183049 A1* | 6/2022 | Lee | H04W 72/569 |
| 2024/0031116 A1* | 1/2024 | Zhang | H04W 72/23 |
| 2024/0187160 A1* | 6/2024 | El Hamss | H04W 72/23 |

OTHER PUBLICATIONS

"3rd Generation Partnership Project; Technical Specification Group Radio Access Network; NR; Medium Access Control (MAC) protocol specification (Release 17)", 3GPP TS 38.321, V17.0.0, Mar. 2022, pp. 1-221.

"LTE Evolved Universal Terrestrial Radio Access (E-UTRA); Radio Link Control (RLC) protocol specification (3GPP TS 36.322 version 12.3.0 Release 12)", ETSI TS 136 322, V12.3.0, Nov. 2015, 43 pages.

"3rd Generation Partnership Project; Technical Specification Group Radio Access Network; NR; Radio Resource Control (RRC) protocol specification (Release 17)", 3GPP TS 38.331, V17.1.0, Jun. 2022, pp. 1-1273.

Extended European Search Report received for corresponding European Patent Application No. 23181693.5, dated Jan. 8, 2024, 8 pages.

* cited by examiner

| D/C | P | SI | R | R | SN | Oct 1 |
|---|---|---|---|---|---|---|
| SN | | | | | | Oct 2 |
| SN | | | | | | Oct 3 |
| SO | | | | | | Oct 4 |
| SO | | | | | | Oct 5 |
| Data ... | | | | | | Oct 6 |
| | | | | | | Oct N |

| Value | Description |
|---|---|
| 00 | Data field contains all bytes of an RLC SDU |
| 01 | Data field contains the first segment of an RLC SDU |
| 10 | Data field contains the last segment of an RLC SDU |
| 11 | Data field contains neither the first nor last segment of an RLC SDU |

Figure 3:
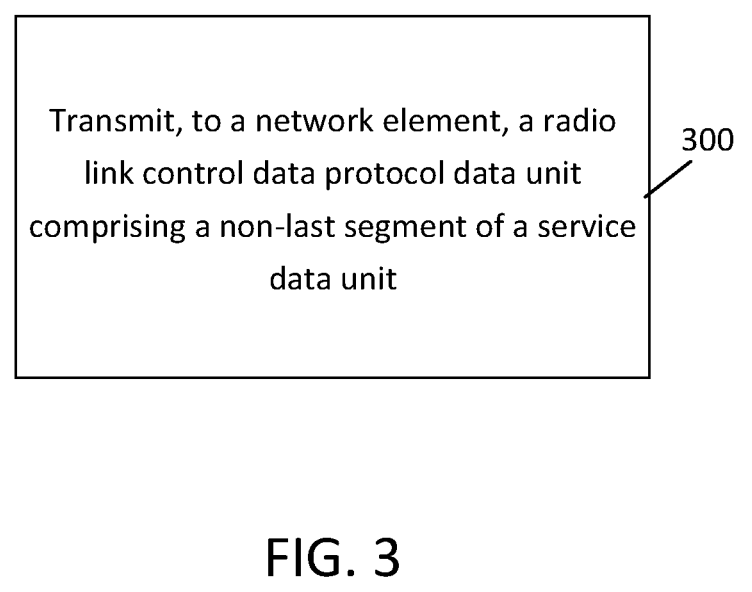

Transmit, to a network element, a radio link control data protocol data unit comprising a non-last segment of a service data unit

Receive a radio link control data protocol data unit comprising a non-last segment of a service data unit          400

Determine, based on the indication, a size of a scheduling grant to carry a subsequent segment of the service data unit          405

Allocate to the user equipment the scheduling grant          410

Receive, from a network element, an uplink scheduling grant;        500

In response to the receiving, generate an uplink protocol data unit for transmission,        505

PROTOCOL DATA UNIT WITH SERVICE DATA UNIT SEGMENT AND INDICATION OF SERVICE DATA UNIT-TAIL LENGTH

FIELD

Some example embodiments may generally relate to mobile or wireless telecommunication systems, such as Long Term Evolution (LTE) or fifth generation (5G) new radio (NR) access technology, or 5G beyond, or other communications systems. For example, certain example embodiments may relate to apparatuses, systems, and/or methods for protocol data unit (PDU) with service data unit (SDU) segment and indication of SDU-tail length.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR may provide bitrates on the order of 10-20 Gbit/s or higher, and may support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the Internet of Things (IoT).

SUMMARY

Some example embodiments may be directed to a method. The method may include transmitting, to a network element, a radio link control data protocol data unit including a non-last segment of a service data unit. According to certain example embodiments, the protocol data unit may include an indication of a number of bytes of the service data unit that follow this segment in the service data unit.

Other example embodiments may be directed to an apparatus. The apparatus may include at least one processor and at least one memory including computer program code. The at least one memory and computer program code may also be configured to, with the at least one processor, cause the apparatus at least to transmit, to a network element, a radio link control data protocol data unit including a non-last segment of a service data unit. According to certain example embodiments, the protocol data unit may include an indication of a number of bytes of the service data unit that follow this segment in the service data unit.

Other example embodiments may be directed to an apparatus. The apparatus may include means for transmitting, to a network element, a radio link control data protocol data unit including a non-last segment of a service data unit. According to certain example embodiments, the protocol data unit may include an indication of a number of bytes of the service data unit that follow this segment in the service data unit.

In accordance with other example embodiments, a non-transitory computer readable medium may be encoded with instructions that may, when executed in hardware, perform a method. The method may include transmitting, to a network element, a radio link control data protocol data unit including a non-last segment of a service data unit. According to certain example embodiments, the protocol data unit may include an indication of a number of bytes of the service data unit that follow this segment in the service data unit.

Other example embodiments may be directed to a computer program product that performs a method. The method may include transmitting, to a network element, a radio link control data protocol data unit including a non-last segment of a service data unit. According to certain example embodiments, the protocol data unit may include an indication of a number of bytes of the service data unit that follow this segment in the service data unit.

Other example embodiments may be directed to an apparatus that may include circuitry configured to transmit to a network element, a radio link control data protocol data unit including a non-last segment of a service data unit. According to certain example embodiments, the protocol data unit may include an indication of a number of bytes of the service data unit that follow this segment in the service data unit.

Certain example embodiments may be directed to a method. The method may include receiving, from a user equipment, a radio link control data protocol data unit including a non-last segment of a service data unit. According to certain example embodiments, the protocol data unit may include an indication of a number of bytes of the service data unit that follow this segment in the service data unit. The method may also include determining, based on the indication, a size of a scheduling grant to carry a subsequent segment of the service data unit. The method may further include allocating to the user equipment the scheduling grant.

Other example embodiments may be directed to an apparatus. The apparatus may include at least one processor and at least one memory including computer program code. The at least one memory and computer program code may be configured to, with the at least one processor, cause the apparatus at least to receive, from a user equipment, a radio link control data protocol data unit including a non-last segment of a service data unit. According to certain example embodiments, the protocol data unit may include an indication of a number of bytes of the service data unit that follow this segment in the service data unit. The apparatus may also be caused to determine, based on the indication, a size of a scheduling grant to carry a subsequent segment of the service data unit. The apparatus may further be caused to allocate to the user equipment the scheduling grant.

Other example embodiments may be directed to an apparatus. The apparatus may include means for receiving, from a user equipment, a radio link control data protocol data unit including a non-last segment of a service data unit. According to certain example embodiments, the protocol data unit may include an indication of a number of bytes of the service data unit that follow this segment in the service data unit. The apparatus may also include means for determining, based on the indication, a size of a scheduling grant to carry a subsequent segment of the service data unit. The apparatus may further include means for allocating to the user equipment the scheduling grant.

In accordance with other example embodiments, a non-transitory computer readable medium may be encoded with instructions that may, when executed in hardware, perform a method. The method may include receiving, from a user equipment, a radio link control data protocol data unit including a non-last segment of a service data unit. According to certain example embodiments, the protocol data unit may include an indication of a number of bytes of the service data unit that follow this segment in the service data unit. The method may also include determining, based on the indication, a size of a scheduling grant to carry a subsequent segment of the service data unit. The method may further include allocating to the user equipment the scheduling grant.

Other example embodiments may be directed to a computer program product that performs a method. The method may include receiving, from a user equipment, a radio link control data protocol data unit including a non-last segment of a service data unit. According to certain example embodiments, the protocol data unit may include an indication of a number of bytes of the service data unit that follow this segment in the service data unit. The method may also include determining, based on the indication, a size of a scheduling grant to carry a subsequent segment of the service data unit. The method may further include allocating to the user equipment the scheduling grant.

Other example embodiments may be directed to an apparatus that may include circuitry configured to receive, from a user equipment, a radio link control data protocol data unit including a non-last segment of a service data unit. According to certain example embodiments, the protocol data unit may include an indication of a number of bytes of the service data unit that follow this segment in the service data unit. The apparatus may also include circuitry configured to determine, based on the indication, a size of a scheduling grant to carry a subsequent segment of the service data unit. The apparatus may further include circuitry configured to allocate to the user equipment the scheduling grant.

Some example embodiments may be directed to a method. The method may include receiving, from a network element, an uplink scheduling grant. The method may also include in response to the receiving, generating an uplink protocol data unit for transmission, the uplink protocol data unit comprising higher-layer data from a plurality of radio bearers. According to certain example embodiments, for at least one of the plurality of radio bearers, an amount of data allocated from the uplink protocol data unit may be increased based on an amount of segments of higher-layer service data units that are pending transmission on the at least one radio bearer.

Other example embodiments may be directed to an apparatus. The apparatus may include at least one processor and at least one memory including computer program code. The at least one memory and computer program code may also be configured to, with the at least one processor, cause the apparatus at least to receive, from a network element, an uplink scheduling grant. The apparatus may also be caused to, in response to the receiving, generate an uplink protocol data unit for transmission, the uplink protocol data unit comprising higher-layer data from a plurality of radio bearers. According to certain example embodiments, for at least one of the plurality of radio bearers, an amount of data allocated from the uplink protocol data unit may be increased based on an amount of segments of higher-layer service data units that are pending transmission on the at least one radio bearer.

Other example embodiments may be directed to an apparatus. The apparatus may include means for receiving, from a network element, an uplink scheduling grant. The apparatus may also include means for, in response to the receiving, generating an uplink protocol data unit for transmission, the uplink protocol data unit comprising higher-layer data from a plurality of radio bearers. According to certain example embodiments, for at least one of the plurality of radio bearers, an amount of data allocated from the uplink protocol data unit may be increased based on an amount of segments of higher-layer service data units that are pending transmission on the at least one radio bearer.

In accordance with other example embodiments, a non-transitory computer readable medium may be encoded with instructions that may, when executed in hardware, perform a method. The method may include receiving, from a network element, an uplink scheduling grant. The method may also include in response to the receiving, generating an uplink protocol data unit for transmission, the uplink protocol data unit comprising higher-layer data from a plurality of radio bearers. According to certain example embodiments, for at least one of the plurality of radio bearers, an amount of data allocated from the uplink protocol data unit may be increased based on an amount of segments of higher-layer service data units that are pending transmission on the at least one radio bearer.

Other example embodiments may be directed to a computer program product that performs a method. The method may include receiving, from a network element, an uplink scheduling grant. The method may also include in response to the receiving, generating an uplink protocol data unit for transmission, the uplink protocol data unit comprising higher-layer data from a plurality of radio bearers. According to certain example embodiments, for at least one of the plurality of radio bearers, an amount of data allocated from the uplink protocol data unit may be increased based on an amount of segments of higher-layer service data units that are pending transmission on the at least one radio bearer.

Other example embodiments may be directed to an apparatus that may include circuitry configured to receive, from a network element, an uplink scheduling grant. The apparatus may also include circuitry configured to, in response to the receiving, generating an uplink protocol data unit for transmission, the uplink protocol data unit comprising higher-layer data from a plurality of radio bearers. According to certain example embodiments, for at least one of the plurality of radio bearers, an amount of data allocated from the uplink protocol data unit may be increased based on an amount of segments of higher-layer service data units that are pending transmission on the at least one radio bearer.

BRIEF DESCRIPTION OF THE DRAWINGS

For proper understanding of example embodiments, reference should be made to the accompanying drawings, wherein:

FIG. 3 illustrates an example flow diagram of a method, according to certain example embodiments.

DETAILED DESCRIPTION

Figures 1, 2:
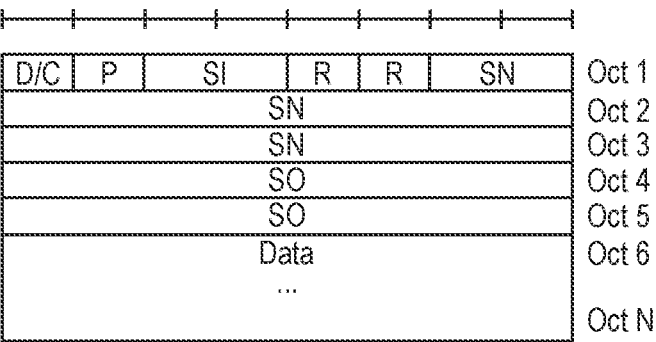
FIG. 1 illustrates an example acknowledged mode data protocol data unit with an 18 bit sequence number with segment offset.
FIG. 2 illustrates an example segment information field interpretation.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for PDU with SDU segment and indication of SDU-tail length.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "cell", "node", "gNB", or other similar language throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

The technical specifications of 3$^{rd}$ Generation Partnership Project (3GPP) define radio link control (RLC) architecture that includes an RLC sub-layer with RLC entities that perform certain functions. For an RLC entity configured at the eNB, there is a peer RLC entity configured at the UE, and vice versa. In NR sidelink communication, for an RLC entity configured at the transmitting UE, there is a peer RLC entity configured at each receiving UE. Additionally, an RLC entity may receive/deliver RLC SDUs from/to an upper layer, and may send/receive RLC PDUs to/from its peer RLC entity via lower layers. The RLC may provide certain services to the upper layer including, for example, transparent mode (TM) data transfer, unacknowledged mode (UM) data transfer, and/or acknowledged mode (AM) data transfer, including indication of successful delivery of upper layers PDUs. The RLC may also provide certain services from the lower layer (i.e., medium access control (MAC)) including, for example, data transfer, and/or notification of a transmission opportunity, together with the total size of the RLC PDU(s) to be transmitted in the transmission opportunity.

An RLC PDU may either be an RLC data PDU, or an RLC control PDU. If an RLC entity receives RLC SDUs from an upper layer, it receives them through a single RLC channel between the RLC and the upper layer, and after forming RLC data PDUs from the received RLC SDUs, the RLC entity may submit the RLC data PDUs to the lower layer through a single logical channel. If an RLC entity receives RLC data PDUs from the lower layer, it may receive them through a single logical channel, and after forming RLC SDUs from the received RLC data PDUs, the RLC entity may deliver the RLC SDUs to the upper layer through a single RLC channel between the RLC and the upper layer. However, if an RLC entity submits/receives RLC data PDUs to/from the lower layer, the RLC entity may submit/receive them through the same logical channel it submits/receives the RLC data PDUs.

In general, a radio resource control (RRC) may control the configuration of the RLC. Functions of the RLC sub layer may be performed by RLC entities. For an RLC entity configured at the gNB, there may be a peer RLC entity configured at the UE and vice versa. In NR sidelink communication, in sidelink discovery, for an RLC entity configured at the transmitting UE, there may be a peer RLC entity configured at each receiving UE. Additionally, an RLC entity may receive/deliver RLC SDUs from/to upper layer and sends/receives RLC PDUs to/from its peer RLC entity via lower layers.

An RLC entity may be configured to perform data transfer in various modes including, for example, TM, an UM, or AM. Thus, an RLC entity may be categorized as a TM RLC entity, an UM RLC entity, or an AM RLC entity depending on the mode of data transfer that the RLC entity is configured to provide.

The TM RLC entity may be configured either as a transmitting TM RLC entity or a receiving TM RLC entity. The transmitting TM RLC entity may receive RLC SDUs from the upper layer, and send RLC PDUs to its peer receiving TM RLC entity via lower layers. The receiving TM RLC entity may deliver RLC SDUs to the upper layer, and receive RLC PDUs from its peer transmitting TM RLC entity via lower layers.

The UM RLC entity may be configured as a transmitting UM RLC entity or a receiving UM RLC entity. Additionally, the transmitting UM RLC entity may receive RLC SDUs from the upper layer, and send RLC PDUs to its peer receiving UM RLC entity via lower layers. The receiving UM RLC entity may deliver RLC SDUs to the upper layer, and receive RLC PDUs from its peer transmitting UM RLC entity via lower layers.

The AM RLC entity may include a transmitting side and a receiving side. The transmitting side of the AM RLC entity may receive RLC SDUs from the upper layer, and send RLC PDUs to its peer AM RLC entity via lower layers. Additionally, the receiving side of the AM RLC entity may deliver RLC SDUs to the upper layer, and receive RLC PDUs from its peer AM RLC entity via lower layers.

According to certain example embodiments, RLC PDUs may be categorized into RLC data PDUs and RLC control PDUs. For instance, RLC data PDUs may be used by TM, UM, and AM RLC entities to transfer upper layer PDUs (i.e., RLC SDUs). Additionally, RLC control PDUs may be used by the AM RLC entity to perform automatic repeat request (ARQ) procedures. Further, RLC PDUs may be characterized by different formats. For instance, an RLC PDU may correspond to a bit string(s), and the bit string may be byte aligned (i.e., multiple of 8 bits) in length. An RLC SDU may be included in an RLC PDU from the first bit onward.

In certain example embodiments, a TM data (TMD) PDU may only include a data field, and no RLC headers. A UM data (UMD) PDU may include a data field and a UMD PDU header that is byte aligned. When a UMD PDU includes a complete RLC SDU, the UMD PDU header may only include the SI and R fields. Further, a UM RLC entity may be configured by radio resource control (RRC) to use either a 6 bit sequence number (SN) or a 12 bit SN. For groupcast and broadcast of NR sidelink communication, a 6 bit SN length may be configured. In addition, according to certain example embodiments, a UMD PDU header may include the SN field when the corresponding RLC SDU is segmented, and a UMD PDU carrying the first segment of an RLC SDU may not carry the segment offset (SO) field in the UMD PDU's header if sduSizeIndication is not configured. In some cases, the length of the SO field may be 16 bits.

FIG. 1 illustrates an example AM data (AMD) PDU with an 18 bit SN with SO. An AMD PDU may include a data field and an AMD PDU header that is byte aligned. An AM RLC entity may be configured by RRC to use either a 12 bit SN or an 18 bit SN. Additionally, the length of the AMD PDU header may be two and three bytes respectively. Further, in certain example embodiments, the AMD PDU header may include a D/C, a P, a SI, and a SN. An AMD PDU header may include the SO field when the data field consists of an RLC SDU segment which is not the first segment, and if sduSizeIndication is configured, when the data field consists of an RLC SDU segment which is the first segment, in which case a 16 bit SO is present.

The data field elements may be mapped to the data field in the order which they arrive to the RLC entity at the transmitter. For instance, for TMD PDU, UMD PDU, and AMD PDU, the granularity of the data field size may be one byte, and the maximum data field size may be the maximum size of a packet data convergence protocol (PDCP) PDU. For the TMD PDU, one RLC SDU may be mapped to the data field of one TMD PDU. For the UMD PDU and the AMD PDU, either of the one RLC SDU or one RLC SDU segment may be mapped to the data field of one UMD PDU or AMD PDU.

The SN field may be 12 bits or 18 bits for the AMD PDU, and 6 bits or 12 bits for the UMD PDU. The SN field may indicate the sequence number of the corresponding RLC SDU. For instance, for RLC AM, the SN may be incremented by one for every RLC SDU. For RLC UM, the SN may be incremented by one for every segmented RLC SDU.

FIG. 2 illustrates an example SI field interpretation. For a length of 2 bits, the SI field may indicate whether an RLC PDU contains a complete RLC SDU or the first, middle, last segment of an RLC SDU. Additionally, for a length of 16 bits, the SO field may indicate the position of the RLC SDU segment in bytes within the original RLC SDU. The SO field may apply to both AMD and UMD PDUs, and an SDU may be segmented at the RLC when the whole SDU does not fit into a MAC PDU. Specifically, the SO field may indicate the position within the original RLC SDU to which the first byte of the RLC SDU segment in the data field corresponds. The first byte of the original RLC SDU may be referred by the SO field value of "0000000000000000", (i.e., numbering starts at zero). In certain example embodiments, when sduSizeIndication is configured for the RLC entity, in data PDUs whose data field contains the first segment of an RLC SDU, the SO field may indicate the number of bytes in the RLC SDU.

In some cases, a gNB's RLC memory may overflow due to an excessive accumulation of received SDU segments. Under certain conditions in live networks, a single SDU may be reported to result in over 30 segments. This may be a sign of either the MAC PDUs assigned by the gNB scheduler being too small, or a lower priority data radio bearer (DRB) receiving left-overs of TBs (i.e., MAC PDUs) at the UE's MAC protocol's logical channel prioritization (LCP) procedure used to divide a MAC PDU among different radio bearers.

It may be assumed that increasing the grant size may solve the problem while trying to improve efficiency and achieve high utilization of grants. However, with the initial SDU transmissions, the size may be unknown beforehand. With outstanding segments, whenever receiving a non-last segment, the needed grant size may be a shot in the dark with respect to the size of the outstanding tail, which is unknown with current PDU formats.

In view of the existing challenges described above, certain example embodiments may provide an uplink (UL) where an RLC data PDU containing a non-last segment of an SDU carriers an indication of how many bytes of the SDU follow this segment. This may be as opposed to the number of bytes preceding segment, indicated by the current SO field, or the implicit zero-tail indication provided by the current SI field for the last segment. This information may be used at reception by the RLC layer of the gNB to determine, and locally indicate to the scheduler (MAC), how large of an allocation of MAC PDU to this RLC entity is needed to carry the rest of the RLC SDU without further segmentation.

According to certain example embodiments, the information of the indication of how many bytes of the SDU follow the non-last segment of the SDU may be used not only in case the initial transmission of the last segment of the SDU fails, but also in cases of massive segmentation where an SDU would otherwise result in dozens of segments. The latter case makes certain example embodiments potentially applicable to RLC UM mode in addition to AM mode.

In certain example embodiments, the indication carried by the RLC data PDU containing the non-last segment of the SDU may be indirect by actually indicating the size of the whole SDU (in which case the number of bytes that follow may be obtained by subtracting from the SDU size the data PDU's data-field size and SO value). In this way, determining the value of the field at transmission does not become a delay-critical operation, which may be the case if it directly indicated the number of bytes remaining and therefore depended on the data-field size.

According to certain example embodiments, the new size indication may be introduced as a brand new RLC header field. However, not all of the current data-PDU formats may have reserved bits that could be used to indicate presence of the new field in the header. This may mean that completely new data-PDU formats may need to be defined. As such, in certain example embodiments, when use of the new indication is configured, the SO field of the currently defined PDU formats may also be included in the data PDUs carrying the first segment of an SDU. Additionally, in other example embodiments, when use of the new indication is configured, the SO field included in this way may carry the new indication. By configuring the SO field in this manner, the currently defined RLC data-PDU formats may be reused. Additionally, a received data PDU carrying a non-first segment of an SDU may indicate (with its SO field as currently defined) how large of an allocation of MAC PDU is needed to receive the preceding bytes of the SDU without segmentation (if not received already). Further, in some example embodiments, a received data PDU carrying the first segment of an SDU may provide the (indirect) indication of how many bytes of the SDU follow this segment.

In some example embodiments, given the additional header overhead, application of the indication may be configurable. For instance, the configuration may be semi-static by RRC, or it may be dynamically signaled using, for example, an RLC data-PDU header field, an RLC control PDU, or a MAC control element (CE). According to certain example embodiments, the dynamic signaling may be based on the RLC-buffer status at the time, although the RLC/MAC-signaling option may be feasible in example embodiments where the RLC header explicitly indicates the presence of the new size indication. In doing so, certain example embodiments may avoid synchronization issues between peer RLC entities with respect to the PDU format that applies to data PDUs carrying the first segment of an SDU.

In other example embodiments, the LCP may be modified such that the occurrence of segments affects how an UL scheduling grant is used. In certain example embodiments, use of the UL scheduling grant may be controlled explicitly by the gNB via a MAC CE or a downlink control information (DCI) such that in this grant (in case of DCI), or in some further grants (MAC CE), the transmissions of outstanding segments take priority in the transport block (TB) before the regular LCP takes place. This may lead to a negative bucket size for the logical channels that are prioritized by this mechanism. In some example embodiments, modification of the LCP may be controlled implicitly by adding more tokens (variable Bj in the MAC protocol) than allowed by the prioritized bit rate (PBR) when segmentation occurs. The various example embodiments above may be implemented together or independently from each other.

According to certain example embodiments, various state variables may be used in AM and UM entities to specify the RLC protocol. The state variables and counters may be non-negative integers, and the state variables related to AM data transfer may take values from 0 to 4095 for 12 bit SN, or from 0 to 262143 for 18 bit SN. In other example embodiments, arithmetic operations on state variables related to AM data transfer may be affected by the AM modulus (i.e., final value=[value from arithmetic operation] modulo 4096 for 12 bit SN and 262144 for 18 bit SN).

According to some example embodiments, the state variables related to UM data transfer may take values from 0 to 63 for 6 bit SN, or from 0 to 4095 for 12 bit SN. Additionally, arithmetic operations on state variables related to UM data transfer may be affected by the UM modulus (i.e., final value=[value from arithmetic operation] modulo 64 for 6 bit SN, and 4096 for 12 bit SN).

In certain example embodiments, certain configurable parameters may be involved with the AM and UM entities. For instance, one parameter may include maxRetxThreshold, which is a parameter that may be used by the transmitting side of each AM RLC entity to limit the number of retransmissions corresponding to an RLC SDU, including its segments. In other example embodiments, another parameter may include pollPDU, which may be used by the transmitting side of each AM RLC entity to trigger a poll for every pollPDU PDUs. In further example embodiments, another parameter may include a pollByte, which may be used by the transmitting side of each AM RLC entity to trigger a poll for every pollByte bytes. In other example embodiments, a parameter may include sduSizeIndication, which may be optionally configured to be used by the transmitting side of an AM RLC entity and a transmitting UM RLC entity to determine use of the SO field in transmitted data PDUs whose data field contains the first segment of an RLC SDU.

According to certain example embodiments, the new MAC CE may be of zero size, or signal the logical channel for which the behavior is to be followed (e.g., by carrying a logical channel ID (LCID)). In case of DCI, the behavior may be triggered for every logical channel experiencing segmentation, or a subset of the logical channels previously configured by the gNB (e.g., via RRC signaling).

Certain example embodiments may modify the number of tokens added to the bucket, and a counter of segments S may be introduced. The LCP procedure may be applied whenever a new transmission is performed. For instance, for each logical channel j, if S is signaled for that logical channel by upper layers, the MAC entity may increment Bj by the product of PBR×T×S before every instance of the LCP procedure, where T is the time elapsed since Bj was last incremented. In other example embodiments, if S is not signaled for that logical channel by the upper layers, the MAC entity may increment Bj by the product of PBR×T before every instance of the LCP procedure, where T is the time elapsed since Bj was last incremented. In some example embodiments, if the value of Bj is greater than the bucket size (i.e., PBR×BSD), the MAC entity may set Bj to the bucket size.

According to certain example embodiments, in UM data transfer, when submitting a UMD PDU to the lower layer, the transmitting UM RLC entity may, if the UMD PDU contains a segment on an RLC SDU, indicate the segment number S of that SDU to the lower layer. In other example embodiments, if the UMD PDU contains a segment of an RLC SDU, the UM RLC entity may set the SN of the UMD PDU to TX_Next. In some example embodiments, if the UMD PDU contains a segment that maps to the last byte of an RLC SDU, then the UM RLC entity may increment TX_Next by one.

In certain example embodiments, in AM data transfer, the transmitting side of an AM RLC entity may prioritize transmission of RLC control PDUs over AMD PDUs. The transmitting side of an AM RLC entity may prioritize transmission of AMD PDUs containing previously transmitted RLC SDUs or RLC SDU segments over transmission of AMD PDUs containing not previously transmitted RLC SDUs or RLC SDU segments. In some example embodiments, when submitting an AMD PDU that contains a segment of an RLC SDU, to the lower layer, the transmitting side of an AM RLC entity may indicate the segment number S of that SDU to the lower layer. In other example embodiments, when submitting an AMD PDU that contains a segment of an RLC SDU, to the lower layer, the transmitting side of the AM RLC entity may set the SN of the AMD PDU to the SN of the corresponding RLC SDU. As a result, twice as many tokens may be added for the second segment, and three times more tokens for the third segment. Additionally, a finer control may be possible by specifying or configuring how many more tokens can be added for which segment.

FIG. 3 illustrates an example flow diagram of a method, according to certain example embodiments. In an example embodiment, the method of FIG. 3 may be performed by a network entity, or a group of multiple network elements in a 3GPP system, such as LTE or 5G-NR. For instance, in an example embodiment, the method of FIG. 3 may be performed by a UE similar to one of apparatuses 10 or 20 illustrated in FIG. 6.

According to certain example embodiments, the method of FIG. 3 may include, at 300, transmitting, to a network element, a radio link control data protocol data unit comprising a non-last segment of a service data unit. According to certain example embodiments, the protocol data unit may include an indication of a number of bytes of the service data unit that follow this segment in the service data unit.

According to certain example embodiments, the method may further include receiving a scheduling grant from the network element based on the indication. According to other example embodiments, the method may also include performing transmission of a subsequent segment of the service data unit via the scheduling grant. According to some example embodiments, the method may also include configuring the indication in a semi-static or a dynamic manner. According to some example embodiments, configuring the indication in the semi-static manner may be performed by a radio resource control. According to other example embodiments, configuring the indication in the dynamic manner is performed with a radio link control data protocol data unit header field, a radio link control protocol data unit, or a medium access control control element.

In certain example embodiments, the indication may be indirect by indicating a size of the whole service data unit. In some example embodiments, the indication may be transmitted via a segment offset field of the protocol data unit. In other example embodiments, a size of the subsequent segment may be dependent upon a logical channel prioritization that is controlled explicitly or implicitly.

Figure 4:
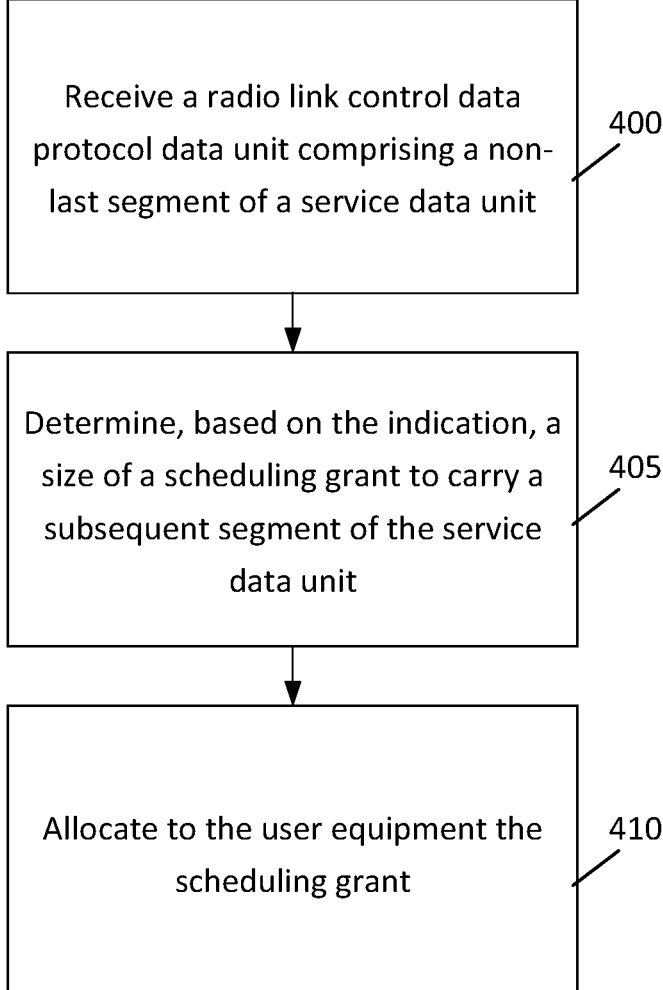
FIG. 4 illustrates an example flow diagram of another method, according to certain example embodiments.

FIG. 4 illustrates an example of a flow diagram of another method, according to certain example embodiments. In an example embodiment, the method of FIG. 4 may be performed by a network entity, or a group of multiple network elements in a 3GPP system, such as LTE or 5G-NR. For instance, in an example embodiment, the method of FIG. 4 may be performed by a gNB, network, cell, or any other device similar to one of apparatuses 10 or 20 illustrated in FIG. 6.

According to certain example embodiments, the method of FIG. 4 may include, at 400, receiving, from a user equipment, a radio link control data protocol data unit comprising a non-last segment of a service data unit. According to certain example embodiments, the protocol data unit may include an indication of a number of bytes of the service data unit that follow this segment in the service data unit. The method may also include, at 405, determining, based on the indication, a size of a scheduling grant to carry a subsequent segment of the service data unit. The method may further include, at 410, allocating to the user equipment the scheduling grant.

According to certain example embodiments, the method may also include indicating, to a scheduler, a size of an allocation of a medium access control protocol data unit to a radio link control protocol entity from which the protocol data unit was received. According to some example embodiments, the indication may be indirect by indicating a size of the whole service data unit. According to other example embodiments, the indication may be received via a segment offset field of the protocol data unit.

In certain example embodiments, the method may further include controlling the scheduling grant size based on a logical channel prioritization that is controlled explicitly or implicitly. In some example embodiments, explicit control of the logical channel prioritization may be via a medium access control control element or downlink control information. In other example embodiments, implicit control of the logical channel prioritization may be performed by adding transport block allocation tokens.

Figure 5:
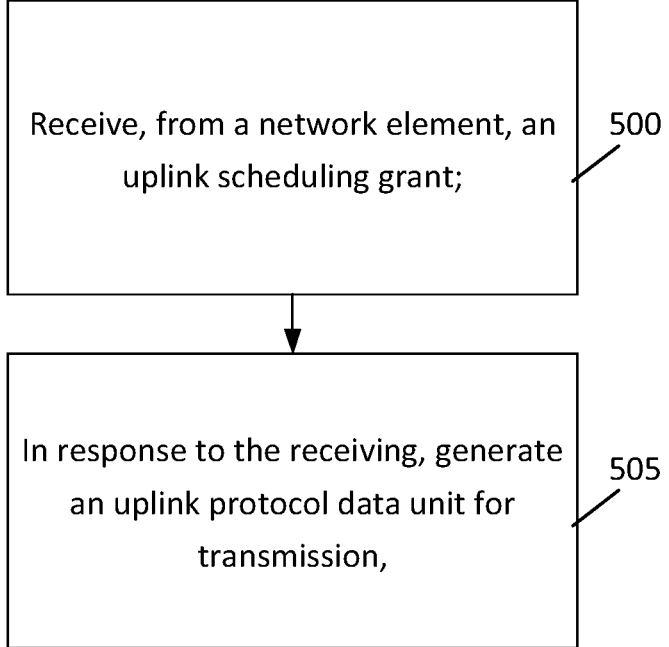
FIG. 5 illustrates an example flow diagram of a further method, according to certain example embodiments.

FIG. 5 illustrates an example flow diagram of a further method, according to certain example embodiments. In an example embodiment, the method of FIG. 5 may be performed by a network entity, or a group of multiple network elements in a 3GPP system, such as LTE or 5G-NR. For instance, in an example embodiment, the method of FIG. 5 may be performed by a UE similar to one of apparatuses 10 or 20 illustrated in FIG. 6.

According to certain example embodiments, the method of FIG. 5 may include, at 500, receiving, from a network element, an uplink scheduling grant. The method may also include, at 505, in response to the receiving, generating an uplink protocol data unit for transmission, the uplink protocol data unit including higher-layer data from a plurality of radio bearers. According to certain example embodiments, for at least one of the plurality of radio bearers, an amount of data allocated from the uplink protocol data unit is increased based on an amount of segments of higher-layer service data units that are pending transmission on the at least one radio bearer.

According to certain example embodiments, the amount of data is allocated based on a logical channel prioritization that is controlled explicitly or implicitly. According to some example embodiments, explicit control of the logical channel prioritization may be via a medium access control control element or downlink control information, and implicit control of the logical channel prioritization may be performed by adding transport block allocation tokens.

Figure 6:
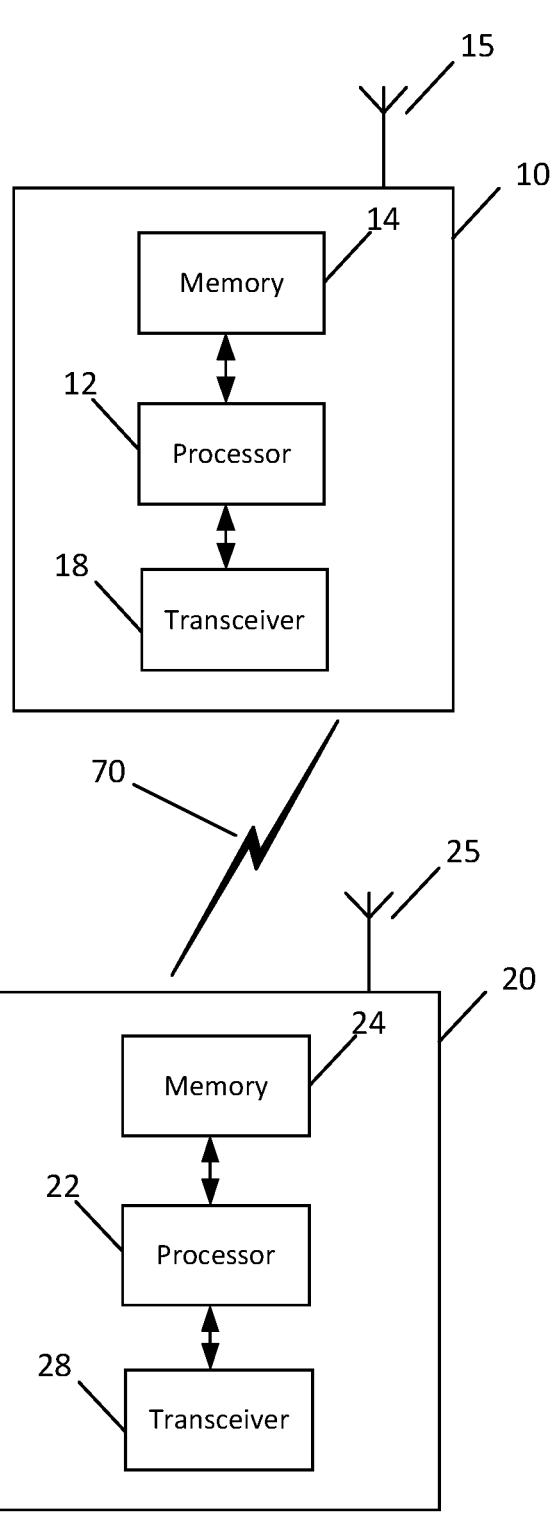
FIG. 6 illustrates a set of apparatuses, according to certain example embodiments.

FIG. 6 illustrates a set of apparatus 10 and 20 according to certain example embodiments. In certain example embodiments, the apparatus 10 may be an element in a communications network or associated with such a network, such as a UE, mobile equipment (ME), mobile station, mobile device, stationary device, IoT device, or other device. It should be noted that one of ordinary skill in the art would understand that apparatus 10 may include components or features not shown in FIG. 6.

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 6.

As illustrated in the example of FIG. 6, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 6, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-5.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-5.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to transmit, to a network element, a radio link control data protocol data unit including a non-last segment of a service data unit. According to certain example embodiments, the service data unit may include an indication of a number of bytes of a subsequent service data unit. Apparatus 10 may also be controlled by memory 14 and processor 12 to receive, from the network element based on the indication, a scheduling grant of a size equal to a size of an allocation of a medium access protocol data unit for data transmission. Apparatus 10 may further be controlled by memory 14 and processor 12 to perform data transmission with the non-last segment of the service data unit via the scheduling grant.

In other example embodiments, apparatus 10 may be controlled by memory 14 and processor 12 to receive, from a network element, an uplink scheduling grant. Apparatus 10 may also be controlled by memory 14 and processor 12 to, in response to the receiving, generate an uplink protocol data unit for transmission. The uplink protocol data unit may include higher-layer data from a plurality of radio bearers. In other example embodiments, for at least one of the plurality of radio bearers, an amount of data allocated from the uplink protocol data unit may be increased based on an amount of segments of higher-layer service data units that are pending transmission on the at least one radio bearer.

As illustrated in the example of FIG. 6, apparatus 20 may be a network, core network element, or element in a communications network or associated with such a network, such as a gNB. It should be noted that one of ordinary skill in the art would understand that apparatus 20 may include components or features not shown in FIG. 6.

As illustrated in the example of FIG. 6, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-5.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-5.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

For instance, in certain example embodiments, apparatus 20 may be controlled by memory 24 and processor 22 to receive, from a user equipment, a radio link control data protocol data unit including a non-last segment of a service data unit. According to certain example embodiments, the service data unit may include an indication of a number of bytes of a subsequent service data unit. Apparatus 20 may also be controlled by memory 24 and processor 22 to determine, based on the indication, a size of an allocation of a medium access control protocol data unit to carry the subsequent service data unit. Apparatus 20 may further be controlled by memory 24 and processor 22 to allocate to the user equipment a scheduling grant of a size equal to the size of the allocation of the medium access protocol data unit.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for transmitting, to a network element, a radio link control data protocol data unit including a non-last segment of a service data unit. According to certain example embodiments, the service data unit may include an indication of a number of bytes of a subsequent service data unit. The apparatus may also include means for receiving, from the network element based on the indication, a scheduling grant of a size equal to a size of an allocation of a medium access protocol data unit for data transmission. The apparatus may further include means for performing data transmission with the non-last segment of the service data unit via the scheduling grant.

Certain example embodiments may also be directed to an apparatus that includes means for receiving, from a network element, an uplink scheduling grant. the apparatus may also include means for, in response to the receiving, generating an uplink protocol data unit for transmission, the uplink protocol data unit comprising higher-layer data from a plurality of radio bearers. In certain example embodiments, for at least one of the plurality of radio bearers, an amount of data allocated from the uplink protocol data unit may be increased based on an amount of segments of higher-layer service data units that are pending transmission on the at least one radio bearer.

Certain example embodiments may also be directed to an apparatus that includes means for receiving, from a user equipment, a radio link control data protocol data unit including a non-last segment of a service data unit. According to certain example embodiments, the service data unit may include an indication of a number of bytes of a subsequent service data unit. The apparatus may also include means for determining, based on the indication, a size of an allocation of a medium access control protocol data unit to carry the subsequent service data unit. The apparatus may further include means for allocating to the user equipment a scheduling grant of a size equal to the size of the allocation of the medium access protocol data unit.

Certain example embodiments described herein provide several technical improvements, enhancements, and/or advantages. For instance, in some example embodiments, it may be possible to reuse currently defined RLC data-PDU formats. In other example embodiments, it may also be possible to receive a data PDU carrying a non-first segment of an SDU indicating (with its SO field) how large of an allocation of MAC PDU is needed to receive the preceding bytes of the SDU without segmentation (if not already received). In further example embodiments, it may be possible to receive data PDU carrying the first segment of an SDU that provides the (indirect) indication of non-received bytes in the SDU. According to some example embodiments, it may be possible to avoid synchronization issues between peer RLC entities with respect to the PDU format that applies to data PDUs carrying the first segment of an SDU. Further, some example embodiments may provide expedited transmission of outstanding segments of UL service data units, thereby reducing build-up of incomplete UL service data units in a reception buffer at the network.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

3GPP 3rd Generation Partnership Project
5G 5th Generation
5GCN 5G Core Network
5GS 5G System
AM Acknowledged Mode
AMD AM Data
ARQ Automatic Repeat Request
BS Base Station
CE Control Element
DCI Downlink Control Information
DL Downlink
DRB Data Radio Bearer
eNB Enhanced Node B
E-UTRAN Evolved UTRAN
gNB 5G or Next Generation NodeB
LCID Logical Channel ID
LCP Logical Channel Prioritization
LTE Long Term Evolution
MAC Medium Access Control
NR New Radio
NW Network
PBR Prioritized Bit Rate
PDU Protocol Data Unit
RLC Radio Link Control
RRC Radio Resource Control
Rx Receive
SDU Service Data Unit
SIB System Information Block
SN Sequence Number
TB Transport Block
TM Transparent Mode
TMD TM Data
Tx Transmit
UE User Equipment
UL Uplink
UM Unacknowledged Mode
UMD UM Data

We claim:

1. A method comprising:
transmitting, to a network element, a radio link control data protocol data unit comprising a non-last segment of a service data unit, wherein the protocol data unit comprises an indication of a number of bytes of the service data unit that follow this segment in the service data unit;
receiving a scheduling grant from the network element based on the indication; and
performing transmission of a subsequent segment of the service data unit via the scheduling grant, wherein a size of the subsequent segment is dependent upon a logical channel prioritization, configured to divide a medium access control protocol data unit among different radio bearers, that is controlled explicitly or implicitly.

2. The method according to claim 1, further comprising:
configuring the indication in a semi-static or a dynamic manner.

3. The method according to claim 2,
wherein configuring the indication in the semi-static manner is performed by a radio resource control, and
wherein configuring the indication in the dynamic manner is performed by means of a radio link control data protocol data unit header field, a radio link control protocol data unit, or a medium access control control element.

4. The method according to claim 1, wherein the indication is indirect by indicating a size of the whole service data unit.

5. The method according to claim 1, wherein the indication is transmitted via a segment offset field of the protocol data unit.

6. An apparatus, comprising:
at least one processor; and
at least one memory including computer program code,
the at least one memory and the computer program code configured to, with storing instructions that, when executed by the at least one processor, cause the apparatus at least to
transmit, to a network element, a radio link control data protocol data unit comprising a non-last segment of a service data unit, wherein the protocol data unit comprises an indication of a number of bytes of the service data unit that follow this segment in the service data unit;
receive a scheduling grant from the network element based on the indication; and
perform transmission of a subsequent segment of the service data unit via the scheduling grant, wherein a size of the subsequent segment is dependent upon a logical channel prioritization, configured to divide a medium access control protocol data unit among different radio bearers, that is controlled explicitly or implicitly.

7. The apparatus according to claim 6, wherein the at least one memory and the computer program code are further configured to, with storing instructions that, when executed by the at least one processor, cause the apparatus at least to:
configure the indication in a semi-static or a dynamic manner.

8. The apparatus according to claim 7,
wherein configuring the indication in the semi-static manner is performed by a radio resource control, and
wherein configuring the indication in the dynamic manner is performed by means of a radio link control data protocol data unit header field, a radio link control protocol data unit, or a medium access control control element.

9. The apparatus according to claim 6, wherein the indication is indirect by indicating a size of the whole service data unit.

10. The apparatus according to claim 6, wherein the indication is transmitted via a segment offset field of the protocol data unit.

11. An apparatus, comprising:
at least one processor; and
at least one memory including computer program code,
the at least one memory and the computer program code configured to, with storing instructions that, when executed by the at least one processor, cause the apparatus at least to
receive, from a user equipment, a radio link control data protocol data unit comprising a non-last segment of a service data unit, wherein the protocol data unit comprises an indication of a number of bytes of the service data unit that follow this segment in the service data unit;
determine, based on the indication, a size of a scheduling grant to carry a subsequent segment of the service data unit;
allocate to the user equipment the scheduling grant; and
control the scheduling grant size based on a logical channel prioritization, configured to divide a medium access control protocol data unit among different radio bearers, that is controlled explicitly or implicitly.

12. The apparatus according to claim 11, wherein the at least one memory and the computer program code are further configured to, with storing instructions that, when executed by the at least one processor, cause the apparatus at least to:
indicate, to a scheduler, a size of an allocation of the medium access control protocol data unit to a radio link control protocol entity from which the protocol data unit was received.

13. The apparatus according to claim 11, wherein the indication is indirect by indicating a size of the whole service data unit.

14. The apparatus according to claim 11, wherein the indication is received via a segment offset field of the protocol data unit.

15. The apparatus according to claim 11,
wherein explicit control of the logical channel prioritization is via a medium access control control element or downlink control information, and
wherein implicit control of the logical channel prioritization is performed by adding transport block allocation tokens.

* * * * *